June 28, 1932.   C. ROSATELLI   1,864,694

ANTILOCKING BRAKE FOR AEROPLANE WHEELS

Filed Dec. 11, 1930

Inventor
Celestino Rosatelli,
by Henry Orth Atty.

Patented June 28, 1932

1,864,694

UNITED STATES PATENT OFFICE

CELESTINO ROSATELLI, OF TURIN, ITALY, ASSIGNOR TO FIAT SOCIETÁ ANONIMA, OF TURIN, ITALY

ANTILOCKING BRAKE FOR AEROPLANE WHEELS

Application filed December 11, 1930, Serial No. 501,712, and in Italy September 30, 1930.

In order to decrease the stopping distance of aeroplanes i. e. the distance traversed on the ground between landing and stopping, the chassis wheels have been provided with brakes. On account of the fact that the resultant of the weight and inertia due to the slowing down of the aeroplane speed is displaced in front of the chassis wheels, the aeroplane is in danger of being thrown over if the brakes are suddenly applied. It is therefore essential that any jamming or locking of the wheels should be prevented.

This invention provides an anti-locking brake of such construction that the resultant of the pressure applied to the lining of the brake shoe tends to detach the brake shoe from the drum.

The accompanying drawing shows diagrammatically by way of example two types of brakes according to this invention.

Figure 1:
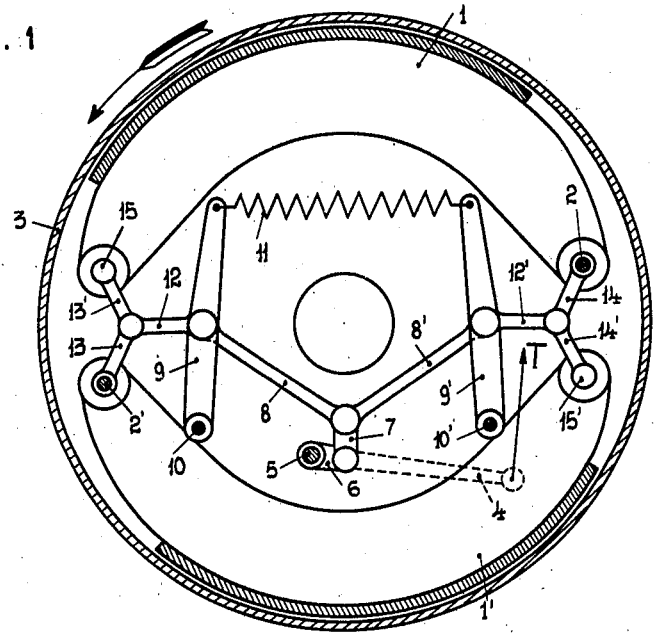
Figure 1 shows a brake the shoes whereof are actuated by a set of levers.

In Figure 1, the two brake shoes 1 and 1' are pivoted to the stationary points 2 and 2'. The direction of rotation of the drum 3, secured to the wheel, is determined by the pivots 2 and 2' at the remote ends of the brake shoes 1 and 1'.

The lever 4 pulled by the pilot is mounted on the spindle 5 externally of the drum 3. The spindle 5 carries within the drum the lever 6 keyed thereto and connected to the link 7 which drives in turn two further links 8 and 8' abutting the two levers 9 and 9' mounted for oscillation about the pivots 10 and 10' and drawn together with the brake shoes towards the center of the brake by the spring 11.

The links 12 and 12' are hinged to the levers 9 and 9' and actuate the links 13—13' and 14—14', respectively.

The links 13 and 14 are hinged at 2 and 2', respectively, while the links 13' and 14' are hinged at 15 and 15' respectively, to the free ends of the brake shoes 1 and 1'.

It will be obvious that by pulling the lever 4 upwardly the lever 6 and link 7 are lifted and this latter by pushing the links 8 and 8' will cause the levers 9 and 9' to diverge stretching the spring 11. The levers 9 and 9' push the links 12 and 12' outwardly which through the links 13—13' and 14—14' cause the brake shoes 1 and 1' to engage the inner wall of the drum 3.

As motion is transmitted in the direction from the stationary pivot 2 (or 2') to the movable pivot 15 (or 15') of each brake shoe, the resultant of the pressure applied to the brake lining passes in proximity to the pivots 15 and 15' and tends to detach the brake shoe from the drum, so that as soon as the pilot ceases pulling the lever 4, the brake shoes are returned towards the center by the spring 11.

Figure 2:
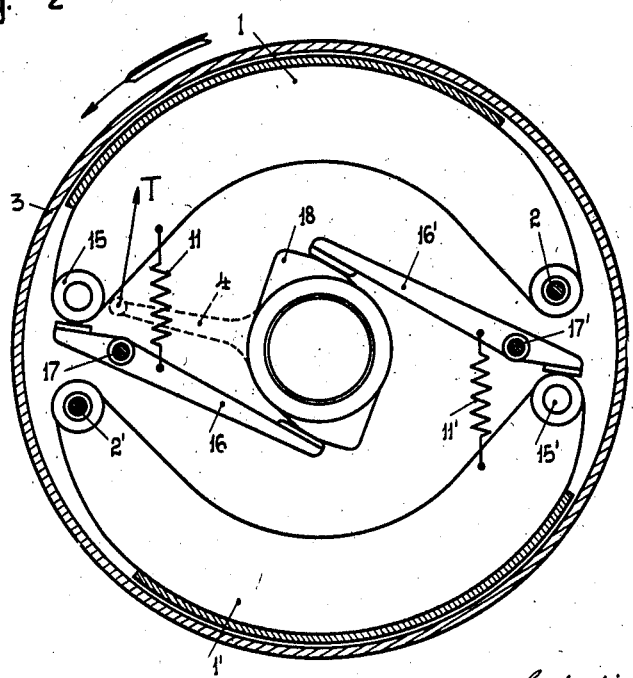
Figure 2 shows a brake the shoes whereof are operated by a cam mechanism.

Referring to Figure 2, the brake shoes 1 and 1' are pivoted at one end to the stationary pivots 2 and 2'. The rotation of the drum 3, secured to the wheel is directed from the pivots 2 and 2' at the opposite ends of the brake shoes 1 and 1' toward the free ends. Said brake shoes carry at their free end rollers 15 and 15', the levers 16 and 16' mounted for oscillating about the pivots 17 and 17' bearing against the rollers 15 and 15'. The springs 11 and 11' serve for simultaneously withdrawing the levers and shoes.

The levers 16 and 16' are acted upon by the double cam 18 concentrical to the wheel axis and actuated by the operating lever 4 to which it is solidly connected. The antilocking effects are identical with those described with reference to the construction shown in Figure 1.

I claim:

In a brake the combination with a brake drum and brake shoes rotatably mounted on fixed pivots and arranged in such a manner that the direction of rotation of the drum is normally directed from the said fixed pivots to the opposite end of said brake shoes, of two-armed levers with one arm of said levers abutting against the free end of said brake shoes, a double cam cooperating with the other arm of said levers and resilient means connecting the brake shoes with the last mentioned arm of said levers.

In testimony that I claim the foregoing as my invention, I have signed my name.

CELESTINO ROSATELLI.